United States Patent Office 3,447,979
Patented June 3, 1969

3,447,979
GELLED NITRIC ACID BLASTING COMPOSITION
AND METHOD OF PREPARING SAME
Harold F. Bluhm, Tamaqua, and Neil E. Gehrig, Schuylkill Haven, Pa., assignors to Atlas Chemical Industries, Inc., Wilmington, Del., a corporation of Delaware
No Drawing. Filed Dec. 23, 1966, Ser. No. 604,166
Int. Cl. C06b 1/00
U.S. Cl. 149—19                                36 Claims

ABSTRACT OF THE DISCLOSURE

A chemical composition prepared from an aqueous nitric acid solution, an inorganic nitrate, a carbonaceous fuel, a nitric acid solution-soluble vinyl polymer stabilizer, and a gelation agent. The chemical composition is a blasting composition having improved stability which results by inclusion of a new stabilizer which may be formed solely of a copolymeric component which gels in the presence of a ferric-ion; or of a minor fraction of such a copolymerized component and/or a simple polymer component which gels in the presence of a ferric-ion, taken in combination with a major fraction of a copolymer of a vinyl monomer and an $\alpha$-$\beta$ unsaturated acid anhydride, or a copolymer of a vinyl monomer and a half, amide-half ammonium salt of the $\alpha$-$\beta$ unsaturated acid.

---

This invention relates to a gelled nitric acid blasting composition prepared by a method wherein a nitric acid solution-soluble vinyl polymer stabilizer is included as a component to improve gel stability in storage and to insure greater reliability of the product in use.

Nitric acid sensitized explosives are known and may include principal components such as an aqueous solution of nitric acid, an inorganic nitrate, a carbonaceous fuel, a water-in-oil type surfactant, an acid-resistant stabilizer and a gelation agent. Compounds such as methyl vinyl ether-maleic anhydride copolymers are examples of acid-resistant stabilizers which have been employed in nitric acid sensitized cap-sensitive explosives. Typically, such explosives are prepared by merely blending the various additives together save the nitric acid which is incorporated lastly. Other methods have been devised such as, first placing the nitric acid component into a mixer and then sequentially adding the other ingredients with mixing until the final gel is prepared.

It has now been found that by including a new nitric acid solution-soluble vinyl polymer stabilizer, formed by the practice of the present invention, in a nitric acid sensitized explosive composition, there results a gelled blasting composition of improved stability in storage and greater reliability in use.

Generally stated, the present invention provides a new method for preparing a gelled nitric acid blasting composition stabilized against component separation by addition of a new nitric acid solution-soluble vinyl polymer stabilizer. The new polymer stabilizer may be formed solely of a copolymeric component which immediately gels in the presence of a ferric-ion. Alternately, a preferred polymer stabilizer may be formed of a minor fraction of such a copolymeric component and/or a simple polymer component which immediately gels in the presence of a ferric-ion, taken in combination with a major fraction of a copolymer of a vinyl monomer and an $\alpha$-$\beta$ unsaturated acid anhydride and/or a vinyl monomer and a half amide-half ammonium salt of an $\alpha$-$\beta$ unsaturated acid.

The present invention may also provide an improved cap-sensitive blasting composition which may be characterized as gels formed by the method of the present invention.

The gelled nitric acid explosive composition of the present invention includes as principal components, materials such as an aqueous solution of nitric acid, an inorganic nitrate, a carbonaceous fuel, a water-in-oil type surfactant, and a gelation agent. In addition, as a necessary component, a new nitric acid solution-soluble vinyl polymer stabilizer is included which effectively aids in retaining the gelled characteristic of the prepared explosive during periods of storage.

The nitric acid component of the present composition is taken as about 100 parts by weight of an aqueous nitric acid solution containing from about 10% to about 80% by weight of nitric acid. Aqueous solutions of about 30% to about 80% by weight of nitric acid are more suitable for use herein since nitric acid solutions of between about 10% and about 30% by weight nitric acid occasionally yield a product which is insensitive to detonation by normal means. Aqueous nitric acid solutions having a nitric acid concentration greater than about 40% are usually preferred and generally produce a final composition having a satisfactory detonation velocity and sensitivity. Aqueous nitric acid solution of about 60% by weight of nitric acid is particularly suited for use in the present composition since such a solution is readily available in the commercial market.

The gelled composition of the present invention may contain from about 20 to about 500 parts by weight of an inorganic nitrate component which may include ammonium nitrate and alkali metal nitrate or mixtures thereof. While commercially available "fertilizer grade" ammonium nitrate is suited for use in the composition of the present invention, sodium nitrate and potassium nitrate may also be used. Preferably, the inorganic nitrate component is in particulate form, that is, having a size that will pass a No. 8 USS screen. A nitrate component in particulate form, for example, in the form of prills, pellets or granules, is also suited for use in the present mixture.

The composition of the present invention includes a carbonaceous fuel material which is immiscible with an aqueous solution of nitric acid. Generally, hydrocarbons whether paraffinic, olefinic, naphthenic, aromatic, saturated or unsaturated are suitable as the carbonaceous fuel component. However, other materials such as saturated fatty acids, higher alcohols having a chain length of from about 6 to about 18 carbon atoms may be found suitable for use herein.

Examples of hydrocarbon fuels suitable in the subject invention include paraffin, paraffin-based waxes, diesel fuel oil, mineral oil, and similar based petroleum products.

Saturated fatty acids suitable for use in this invention include octanoic acid, decanoic acid, lauric acid, palmitic acid, behenic acid and stearic acid.

Suitable higher alcohols include hexyl alcohol, nonyl alcohol, lauryl alcohol, cetyl alcohol and steary alcohol.

Other immiscible, carbonaceous fuels useful in the present invention are vegetable oils such as corn oil, cottonseed oil and soybean oil. Powdered carbon is also suitable for use to supply the required carbonaceous fuel component of the subject invention.

Carbohydrate materials, for example, sugars in dry form such as sucrose, or in solution such as molasses, may be utilized as supplemental fuels if desired. In addition, any carbonaceous fuel substantially unreactive with nitric acid on simple mixing may be used in the subject compositions as the fuel component if desired.

The fuel material selected for use in the present invention will generally depend upon the desired physical form of the final product. The firmness of the gelled composition may be varied depending on which fuel material is used.

Generally, the present composition contains about 6 to about 150 parts by weight of immiscible, carbonaceous fuel based on 100 parts by weight of aqueous nitric acid solution.

The term "immiscible with aqueous nitric acid" as used herein is intended to mean the inability of an ingredient to form a stable homogenous mixture with an aqueous solution of nitric acid containing between about 30% and about 80% by weight of nitric acid.

The present composition preferably contains small amounts of a suitable water-in-oil type surfactant such as an amount up to about 50 parts by weight which is desirably added to aid in maintaining a homogenous mixture. Desirably, from about 1.5 to about 30 parts by weight of suitable water-in-oil type surfactant suitably emulsifies the present composition. However, additional amounts of surfactant, up to about 50 parts by weight, may be added since the surplus surfactant may serve as a supplemental fuel for the mixture.

Suitable water-in-oil type surfactants found useful herein include those derivable from sorbitol through removal of one molecule of water. Such sorbitan surfactants may include sorbitan fatty acid esters such as sorbitan monolaurate, sorbitan monooleate, sorbitan monopalmitate, sorbitan monostearate and sorbitan tristearate. The mono- and diglycerides of fat-forming fatty acids are also useful as water-in-oil type surfactants. Mixtures of these various surfactants may also prove useful.

A suitable gelation agent is also incorporated into the present composition to promote the formation of the desired gelled structure. It appears that the gelation agent acts to increase the reaction rate between the components forming the initial emulsion structure of the present composition, thereby causing formation of a gelled composition possessing the desired properties. As a result of the formation of this gelled composition, an explosive product may be obtained whose sensitivity is retained during storage. Tri-valent iron salts and tri-valent aluminum salts have been found to be suitable gelation agents in the present composition. Suitable iron salts which supply a ferric-ion to the system during formation of the gelled composition include ferric sulfate, ferric chloride and ferric nitrate. Among suitable aluminum salts are aluminum sulfate, aluminum chloride and aluminum nitrate.

Tetra-valent tin salts may also serve as the gelation agent in the present composition. Among suitable tin salts are stannic chloride, stannic nitrate and stannic sulfate.

Additional materials that perform satisfactorily as the gelation agent are those selected from the group consisting of polyethylenimine, polyethylenimine nitrate, diethylene triamine, triethylenetetramine, rhodamine B and aminoglycerol.

Generally from about 0.1 to about 66 parts by weight of gelation agent is used in the subject composition depending upon storage requirements. Most often, from about 0.3 part to about 30 parts by weight of gelation agent is sufficient. Although quantities of gelation agent below 0.3 part by weight may prove to have an insufficient effect for prolonged storage requirements, amounts of gelation agent up to about 66 parts by weight may be added if desired.

The new nitric acid solution-soluble vinyl polymer stabilizer of the present invention is added to the composition in an amount of about 0.3 to about 50 parts by weight. In most instances, from about 1 to about 30 parts by weight of the new stabilizer is used to stabilize the present gel. However, amounts up to about 50 parts by weight of stabilizer may prove to be useful depending upon the final characteristics desired in the gelled product.

The new nitric acid solution-soluble vinyl polymer stabilizer of the present invention is formed of a polymer material which immediately gels in the presence of a ferric-ion. The polymer material may consist solely of a vinyl copolymeric material capable of immediately forming a gel in the presence of a ferric-ion. This copolymeric material is formed of a vinyl monomer, and an $\alpha$–$\beta$ unsaturated acid. Alternately, the polymer material capable of immediately forming a gel in the presence of a ferric-ion may include a simple polymer component. When the simple polymer component is included as the polymer material which gels in the presence of a ferric-ion, it is necessary to include as a major fraction of the stabilizer, a copolymer of either a vinyl monomer and an $\alpha$–$\beta$ unsaturated acid anhydride, or a vinyl monomer and a half amide-half ammonium salt of an $\alpha$–$\beta$ unsaturated acid.

When a simple polymer capable of immediately forming a gel in the presence of a ferric-ion is included as a component of the new stabilizer, it is preferred that the simple polymer be added as a minor portion from about 15% to about 40% by weight of the stabilizer composition. The copolymer component which is capable of immediately forming a gel in the presence of a ferric-ion may be added to form the stabilizer, either combined with the simple polymer or in place thereof such that the percentage addition to the stabilizer which is capable of immediately forming a gel with a ferric-ion remains in the range of 15% to about 40% of the stabilizer composition. Percentages greater or lesser of the minor fraction of the stabilizer, i.e., that fraction which is capable of immediately forming a gel in the presence of ferric-ion, while effective in the present process does not appear to provide optimum stability in gelled products unless the copolymer of a vinyl monomer and an $\alpha$-$\beta$ unsaturated acid which is capable of immediately forming a gel in the presence of a ferric-ion is the sole component forming the new stabilizer.

The major fraction of the stabilizer, in an amount from about 60% by weight to about 85% by weight, is a copolymeric component formed of a vinyl monomer and a member selected from the group consisting of an $\alpha$-$\beta$ unsaturated acid anhydride and a half amide-half ammonium salt of an $\alpha$-$\beta$ unsaturated acid.

The simple polymer component which is capable of immediately forming a gel in the presence of a ferric-ion may be a water soluble acrylic polymer such as polyacrylic acid, polymers of acrylamide, and polymers of methacrylic acid.

The $\alpha$-$\beta$ unsaturated acid radical appearing herein as the acid, as the anhydride form thereof, or as the half amide-half ammonium salt form in the stabilizer composition may be derived from $\alpha$-$\beta$ unsaturated acids such as maleic acid, citraconic acid, aconitic acid and itaconic acid.

The vinyl monomer as used herein may be either substituted or unsubstituted and is selected from the group consisting of ethylene, styrene, ethyl vinyl ether and methyl vinyl ether. The vinyl monomer may also be substituted with a lower alkyl radical having from 1 to 6 carbon atoms.

A copolymeric component of a vinyl monomer and an $\alpha$-$\beta$ unsaturated acid anhydride found suitable for use herein includes copolymers of methyl vinyl ether-maleic anhydride. Copolymers of methyl vinyl ether-maleic anhydride are sold under the trademark "Gantrez" by the General Aniline and Film Corporation. Various forms of "Gantrez" are available and among those found suitable for use herein are Gantrez AN-119, a low-molecular-weight grade having a specific viscosity at 25° C., of about 0.1–0.5; Gantrez AN-139, a medium-molecular-weight grade having a specific viscosity at 25° C., of about 1.0–1.4; Gantrez AN-149, a medium-molecular-weight grade having a specific viscosity at 25° C., of about 1.5–2.0; and Gantrez AN-169, a high-molecular-weight grade having a specific viscosity at 25° C., of about 2.6–3.5.

One method by which the copolymeric component which is capable of immediately forming a gel in the presence of a ferric-ion may be formed is, for example, by conversion of the copolymers of a vinyl monomer and an α-β unsaturated acid anhydride such as copolymers of methyl vinyl ether-maleic anhydride to the hydrolysate form prior to incorporation with the gelation agent. Conversion of the copolymer of a vinyl monomer and the acid anhydride into the hydrolysate form may be effected by reaction with an acid such as aqueous nitric acid solution. Other aqueous acid solutions and water may also be employed if desired. When water is employed to convert the copolymer acid anhydride into its hydrolysate form, the conversion may be accomplished by stirring the copolymer acid anhydride into a small quantity of water in an amount which will not reduce the concentration of the aqueous nitric acid solution in the formulation below the desired limit. Alternately, these hydrolysates of a vinyl monomer and an α-β unsaturated acid anhydride may be purchased and added as a prepared ingredient in the present process.

When the hydrolysate formed by direct conversion of the copolymer of a vinyl monomer and the acid anhydride is used herein, it may be prepared sufficiently in advance so as to allow the copolymer of a vinyl monomer and the acid anhydride to be sufficiently aged to effect adequate solution and conversion to its hydrolysate form before it is incorporated with the remainder of the ingredients of the present composition. Generally, it is necessary to form a pre-blend of about 60% aqueous nitric acid solution and the copolymer of a vinyl monomer and the acid anhydride and permit it to age at room temperature for a sufficient period of time to obtain adequate solution and the formation of a sufficient amount of the hydrolysate. An aging period of from about 2 to about 48 hours is found to be sufficient to form an adequate solution of the hydrolysate.

After the hydrolysate has been formed by the addition of aqueous nitric acid solution, or related material, to the acid anhydride, or alternately pre-obtained in such form, the hydrolysate may be gelled by addition of a suitable gelation agent such as for example, ferric sulfate. Such a hydrolysate-ferric ion gel is immediately formed when the ingredients of the subject blasting composition are combined. The ion gel appears to act as an initial stabilizer for the combined ingredients of an initially formed nitric acid emulsion until the entire system comes to equilibrium and is more permanently stabilized as a gel by the formation of very slow-forming, highly complex polymers.

The process of the present invention generally involves forming a gelled blasting composition by mixing an aqueous nitric acid solution, an inorganic nitrate, a carbonaceous fuel immisicible with the nitric acid solution, the new nitric acid solution-soluble vinyl polymer stabilizer of the present invention, and a gelation agent. This basic process is generally performed using very rapid mixing of all the ingredients within controlled temperature ranges determined for each unit. Although some difficulty may be experienced in simply combining all the basic ingredients, conventional equipment is available to perform such a process for producing a product of substantially uniform consistency.

Sufficient gas may be introduced into the present composition by any suitable means such as by using a gas inducing mixer or by direct introduction of gas into the emulsion which is then subsequently blended. An example of a gas inducing mixer is a ribbon-type mixer whereas the Votator type unit by Girdler Company, Louisville, Kentucky exemplifies suitable means for combining directly introduced gas with the emulsion. The gas may be added such that the prepared composition has a density from about 0.50 gms./cc. to about 1.60 gms./cc. at about 95° F. A composition having a density of from about 1.05 gms./cc. to about 1.25 gms./cc. is preferred since such a composition retains favorable explosive properties. Since use of one of the preferred embodiments of the present invention requires that the components of the present composition be proportioned within rather specific ranges, the composition being processed may be heated to drive off entrapped gas. By having an entrapped gas-free system during the pre-blending or blending stages a standard composition results into which the exact amount of gas to be added may be determined to avoid wide variance in densities of the prepared composition.

The process of the present invention may also be performed by initially forming a pre-blend of an aqueous nitric acid solution, an inorganic nitrate, and the new stabilizer of this invention; and a pre-blend of a carbonaceous fuel immiscible with the nitric acid solution, the water-in-oil type surfactant when used, and a gelation agent. Thereafter, these two preblends, having substantially uniform consistency, are combined by mixing to form a substantially uniform final composition. By preparing two pre-blends in this fashion, the ingredients may be more easily combined with simple processing equipment than in the process wherein the ingredients are all simply blended together.

The process of the present invention, in one preferred embodiment, comprises, first preparing pre-blends of: (A) one or more inorganic nitrates selected from the group consisting of ammonium nitrate and alkali metal nitrates; a copolymer of a vinyl monomer and an α-β unsaturated acid anhydride, and a gelation agent; (B) a carbonaceous fuel, and a suitable water-in-oil type surfactant, when included; and (C) one or more inorganic nitrates selected from the group consisting of ammonium nitrate and alkali metal nitrates, an aqueous nitric acid solution, and a copolymer of a vinyl monomer and an α-β unsaturated acid anhydride. Pre-blends (A), (B) and (C) are independently charged into a mixer when they are agitated to form a substantially uniform composition. Sufficient gas may be introduced by any suitable means in accordance with the density requirements and explosive properties of the final product.

Pre-blend (A), above, may be designated as a dry blend and may suitably consist of a mixture of ammonium nitrate, sodium nitrate, methyl vinyl ether-maleic anhydride copolymer and ferric sulfate. This pre-blend may be prepared in the mixer wherein the combining of the addition pre-blends takes place in making the finished product.

Pre-blend (B), above, may be designated as a fuel blend and may, for example, include mineral oil, paraffin and a suitable water-in-oil type surfactant when used. Preparation of the fuel blend may be accomplished in tanks suitable for containing such material and equipped with an agitating means and temperature control.

Pre-blend (C), above, may be designated as the acid blend. This blend may include ammonium nitrate, aqueous nitric acid and methyl vinyl ether-maleic anhydride copolymer. The acid blend should be prepared in advance in a stainless steel tank, or other resistant material tank which is also equipped with a suitable agitator and a means for temperature control.

In order to permit the hydrolysate of methyl vinyl ether-maleic anhydride to form in acid blend (C), above, it is preferred that pre-blend (C) be prepared about 2 to about 48 hours before being combined with pre-blends (A) and (B).

In another embodiment of the present invention, the ingredients of pre-blends (A) and (B), above, may be made initially formed into one pre-blend and then, the acid blend (C) may be added thereto with mixing.

In yet another embodiment of the present invention the ingredients of the acid blend (C) and the dry blend (A), above, may be made initially into one pre-blend and then, the combined materials may be added to pre-blend (B) with mixing.

In the step of bringing together the pre-blends in the present method, it has been discovered that greater uniformity of product may be obtained if the temperature during the mixing cycles is kept within the range from about 100° F. to about 135° F. However, the process of this invention may be performed outside these temperature limits if desired.

In order to further illustrate the present invention, the following examples are given wherein all parts are by weight unless otherwise indicated:

EXAMPLE 1

A gelled blasting composition is prepared by actively mixing the following ingredients:

| | Lbs. |
|---|---|
| Ammonium nitrate | 130 |
| Aqueous nitric acid solution (60%) | 60 |
| Sodium nitrate | 10 |
| Paraffin | 8 |
| Sorbitan monopalmitate | 5 |
| Gantrez AN–169 | 4.5 |
| Methyl vinyl ether-maleic hydrolysate | 1.5 |
| Ferric sulfate | 1 |
| Mineral oil | 1 |

The above ingredients are combined at a temperature of about 115° F. to form a substantially uniform emulsion composition. Sufficient air is introduced into the blend during mixing such that the composition has a density of about 1.29 gms./cc. at about 110° F.

EXAMPLE 2

A gelled blasting composition is prepared by first mixing the following ingredients as pre-blends:

Pre-blend A

| | Lbs. |
|---|---|
| Ammonium nitrate | 130 |
| Aqueous nitric acid solution (60%) | 60 |
| Sodium nitrate | 10 |
| Methyl vinyl ether-maleic hydrolysate | 6 |
| Ferric sulfate | 1 |

Pre-blend B

| | |
|---|---|
| Paraffin | 8 |
| Sorbitan monopalmitate | 5 |
| Mineral oil | 1 |

Pre-blends A and B are prepared as substantially uniform blends. Thereafter, pre-blend B at 90° F. is added with mixing to pre-blend A maintained at 110° F. Sufficient air is introduced into the blend during mixing such that the composition has a density of about 0.75 gms./cc. at 110° F.

EXAMPLE 3

The procedure of Example 2 is repeated except that pre-blend A is prepared with 1.5 pounds of methyl vinyl ether-maleic hydrolysate and pre-blend B further contains 4.5 pounds of methyl vinyl ether-maleic anhydride. A product having a similar density is prepared.

EXAMPLE 4

The procedure of Example 2 is repeated except that pre-blend A is prepared with substitution of 1.5 pounds of polyacrylic acid in place of the hydrolysate and pre-blend B further contains 4.5 pounds of the copolymer of methyl vinyl ether-maleic anhydride. A product having a similar density is prepared.

EXAMPLE 5

A gelled blasting composition is prepared by first mixing the following ingredients as pre-blends.

Pre-blend A

| | Lbs. |
|---|---|
| Ammonium nitrate | 39 |
| Sodium nitrate | 10 |
| Gantrez AN–169 | 4.5 |
| Ferric sulfate | 1 |

Pre-blend B

| | |
|---|---|
| Mineral oil | 1 |
| Paraffin | 8 |
| Sorbitan monopalmitate | 5 |

Pre-blend C

| | |
|---|---|
| Ammonium nitrate | 70 |
| 60% aqueous nitric acid | 60 |
| Gantrez AN–169 | 1.5 |

Pre-blend A is prepared in a Sprout-Waldron ribbon mixer whereas pre-blends B and C are prepared in separate stainless steel tanks provided with a power-driven propeller mixer. Pre-blend C is prepared a day prior to pre-blends A and B to permit formation of the hydrolysate form of Gantrez AN–169.

After thoroughly mixing pre-blend A at 90° F., pre-blend B at about 115° F. is added thereto under agitation. Pre-blend C is added to the mixture of pre-blends A and B and the composite mixture is thoroughly agitated to form the desired composition. The temperature of the emulsion during formation is kept at about 127° F. The prepared emulsion is pumped through a Votator (a trademarked product of Girdler Co., Louisville, Ky.) after air is introduced. The temperature of the blasting composition issuing from the Votator is about 117° F. and has a density of 1.15 gms./cc.

EXAMPLE 6

The method of Example 5 is repeated except that a copolymer of styrene and maleic anhydride is used in place of Gantrez AN–169 in pre-blend A.

EXAMPLE 7

The method of Example 5 is repeated except that the components of pre-blends A and B are initially made as one combined pre-blend and then pre-blend C is added thereto.

EXAMPLE 8

A gelled blasting composition is prepared by first mixing the following ingredients as pre-blends:

Pre-blend A

| | Lbs. |
|---|---|
| Ammonium nitrate | 109 |
| Sodium nitrate | 10 |
| Gantrez AN–169 | 4.5 |
| Mineral oil | 1 |
| Paraffin | 8 |
| Sorbitan monooleate | 5 |
| Aqueous nitric acid (60%) | 60 |
| Ferric sulfate | 1 |

Pre-blend B

| | |
|---|---|
| Gantrez AN–169 | 1.5 |
| Water | 8 |

Pre-blend A is prepared in a Sprout-Waldron ribbon mixer whereas pre-blend B is prepared a day prior by blending in a stainless steel kettle. After thoroughly mixing pre-blend A, at about 95° F., pre-blend B at about 115° F. is added thereto under agitation. The temperature of the mixture is maintained between about 110° F. and 135° F. The combined mixture is passed to a Votator after air is injected into the slurry and the resulting product is found to have a density of about 1.15 gms./cc. at about 118° F.

EXAMPLE 9

Pre-blends A, B and C of Example 5 are prepared and combined to form a finished product by the procedures of Example 5 with the exception that Gantrez AN–169 in pre-blends A and C is replaced with like weights of a copolymer of styrene and maleic anhydride (1:1 mol ratio).

EXAMPLE 10

Pre-blends A, B and C of Example 5 are prepared and combined to form a finished product by the procedure of Example 5 with the exception that Gantrez AN-169 in pre-blends A and C is replaced with like weights of a copolymer of styrene and itaconic anhydride (1:1 mol ratio).

EXAMPLE 11

The procedure of Example 8 is repeated except a copolymer of maleic anhydride and ethylene (1:1 mol ratio) is substituted for Gantrez AN-169 in both pre-blend A and pre-blend B.

EXAMPLE 12

The procedure of Example 8 is repeated except that a copolymer of maleic anhydride and ethyl vinyl ether (1:1 mol ratio) is substituted for Gantrez AN-169 in both pre-blend A and pre-blend B.

The composition of the present invention may include other ingredients to modify the physical properties of the mixture. For example, ammonium nitrate or alkali metal nitrates may be initially treated with a thin coating of protective material to minimize caking of the particles. A thin coat of clay, diatomaceous earth, or organic agents, such as a mixture of sulfonates of mono- and/or dimethyl naphthalenes are frequently used as additives to particulate nitrates. Generally the inorganic additives such as clay are present in an amount of from about 0.5% to about 5.0% by weight of ammonium or alkali metal nitrate. The organic additives are frequently effective in amounts as low as 0.05% by weight of the nitrate component.

The sensitivity and detonation velocity of the composition of the present invention may be stabilized by the addition of an inert, non-explosive propagation sustaining material, for example, expanded particulate perlite, or hollow glass balls. Generally about 1 part by weight of propagation sustaining material, based on 100 parts by weight of a 60% nitric acid solution, is required to obtain an advantage and usually more than about 70 parts by weight of propagation sustaining material fails to yield further improvement. Suitable propagation sustaining material has a particle size that will pass through a No. 8 USS screen.

The compositions of this invention may be used as a dynamite type product or as an effective primer for nitrocarbonitrate blasting agents. These compositions may be molded, cast or extruded into any desired shape. The subject formulas may be varied so as to produce a solid mixture by varying the carbonaceous fuel component and/or suitably extending the heating step.

The compositions of the present invention have the advantage of performing as powerful explosives but do not contain, in the preferred embodiments, a sensitive high explosive component. Such compositions are highly insensitive to usual mechanical shock but are sensitive to detonation when initiated by conventional blasting caps generally used in the art.

It is understood that the foregoing detailed description is given merely by way of illustration and that many variations may be made therein without departing from the spirit of this invention.

What is claimed is:

1. A process for preparing a blasting composition which comprises, mixing:
   (1) an aqueous nitric acid solution;
   (2) an inorganic nitrate selected from the group consisting of ammonium nitrate and alkali metal nitrate;
   (3) a carbonaceous fuel immiscible with said nitric acid solution;
   (4) the hydrolysate of a copolymer of a vinyl monomer and an $\alpha$-$\beta$ unsaturated acid anhydride; and
   (5) a gelation agent.

2. The process of claim 1 wherein said vinyl monomer is selected from the group consisting of ethylene, styrene, ethyl vinyl ether, and methyl vinyl ether, and said $\alpha$-$\beta$ unsaturated acid anhydride is selected from the group consisting of maleic anhydride, citraconic anhydride, aconitic anhydride, and itaconic anhydride.

3. A process for preparing a blasting composition of claim 1 wherein:
   (1) the aqueous nitric acid solution is present in an amount of 100 parts by weight;
   (2) the inorganic nitrate is present in an amount from about 20 to about 500 parts by weight;
   (3) the carbonaceous fuel is present in an amount from about 6 to about 150 parts by weight;
   (4) the hydrolysate is present in the amount from about 0.3 to about 50 parts by weight; and
   (5) the gelation agent is present in an amount from about 0.1 to about 66 parts by weight.

4. The process of claim 3 wherein the suitable gelation agent is one capable of supplying a ferric-ion in the mixing step.

5. A process for preparing a blasting composition which comprises, mixing:
   (1) an aqueous nitric acid solution;
   (2) an inorganic nitrate selected from the group consisting of ammonium nitrate and alkali metal nitrate;
   (3) a carbonaceous fuel immiscible with said nitric acid solution;
   (4) a polymer stabilizer selected from the group consisting of
      (a) the hydrolysate of a copolymer of a vinyl monomer and an $\alpha$-$\beta$ unsaturated acid anhydride, and
      (b) a water soluble acrylic polymer;
   (5) a nitric acid solution-soluble vinyl polymer stabilizer selected from the group consisting of a copolymer of a vinyl monomer and an $\alpha$-$\beta$ unsaturated acid anhydride, and a copolymer of a vinyl monomer and a half amide-half ammonium salt of an $\alpha$-$\beta$ unsaturated acid; and
   (6) a gelation agent.

6. The process of claim 5 wherein subdivision (4) is polyacrylic acid.

7. The process of claim 5 wherein said vinyl monomer of subdivision (4) is selected from the group consisting of ethylene, styrene, ethyl vinyl ether, and methyl vinyl ether, and said $\alpha$-$\beta$ unsaturated acid hydride is selected from the group consisting of maleic anhydride, citraconic anhydride, aconitic anhydride, and itaconic anhydride.

8. A process of claim 5 wherein the total amount of stabilizer of subdivision (4) and subdivision (5) is formed of a fraction of from about 15% to about 40% by weight of the stabilizer of subdivision (4), and of a fraction of from about 60% to about 85% by weight of the stabilizer of subdivision (5).

9. A process for preparing a blasting composition of claim 5 wherein the vinyl monomer of subdivision (5) is selected from the group consisting of ethylene, styrene, ethyl vinyl ether, and methyl vinyl ether; and the $\alpha$-$\beta$ unsaturated acid of subdivision (5) is selected from the group consisting of maleic acid, citraconic acid, aconitic acid and itaconic acid.

10. A process for preparing a blasting composition of claim 5 wherein a water-in-oil type surfactant is included as a component of the mixing step.

11. A process for preparing a blasting composition of claim 5 wherein sufficient gas is introduced into the gelled blasting composition during mixing to form a gel having a density from about 0.50 gms./cc. to about 1.60 gms./cc. at about 95° F.

12. A process for preparing a blasting composition of claim 5 wherein:
   (1) the aqueous nitric acid solution is present in an amount of 100 parts by weight;
   (2) the inorganic nitrate is present in an amount of about 20 to about 500 parts by weight;
   (3) the carbonaceous fuel is present in an amount of about 6 to about 150 parts by weight;

(4) the total of the polymer stabilizers of subdivisions 4 and 5 is present in an amount of about 0.3 to about 50 parts by weight; and (5) the gelation agent is present in an amount of about 0.1 to about 66 parts by weight.

13. A process of claim 12 wherein the suitable gelation agent is one capable of supplying a ferric-ion in the mixing step.

14. A process of claim 5 wherein a non-explosive propagation sustaining material is included as a component in mixing of the composition.

15. A process of claim 12 wherein from about 1 to about 70 parts by weight of non-explosive propagation sustaining material is included as a component in the mixing of the composition.

16. A process of claim 12 wherein from about 1 to 70 parts by weight of expanded perlite having a particle size that will pass through a No. 8 USS screen is included as a component in the mixing of the composition.

17. A process for preparing a blasting composition which comprises:
(A) preparing a first pre-blend of
  (1) an aqueous nitric acid solution;
  (2) an inorganic nitrate selected from the group consisting of ammonium nitrate and alkali metal nitrate; and
  (3) a stabilizer compound of a copolymer of a vinyl monomer and an $\alpha$-$\beta$ unsaturated acid anhydride; and
(B) preparing a second pre-blend of
  (1) a carbonaceous fuel immiscible with said aqueous nitric acid solution, and
  (2) a gelation agent; and
(C) aging pre-blend (A) for a period of time to allow the hydrolysate of the copolymer of a vinyl monomer and an $\alpha$-$\beta$ unsaturated acid anhydride to form; and
(D) mixing pre-blends A and B at a temperature sufficient to form an emulsion composition.

18. A process for preparing a blasting composition of claim 17 wherein the aging period (C) is from about 2 hours to about 48 hours.

19. A process of claim 17 wherein the gelation agent is one capable of supplying a ferric-ion in mixing step (D).

20. A cap sensitive blasting composition which comprises,
(a) about 20 to about 500 parts by weight of an inorganic nitrate selected from the group consisting of ammonium nitrate and alkali metal nitrate;
(b) a mixture of the following materials aged for a period of about 2 to about 48 hours:
  (1) 100 parts by weight of aqueous nitric acid solution, and
  (2) about 0.3 to about 50 parts by weight of a member selected from the group consisting of a copolymer of a vinyl monomer and an $\alpha$-$\beta$ unsaturated acid anhydride, and a water soluble acrylic polymer;
(c) up to about 50 parts by weight of a water-in-oil type surfactant;
(d) up to about 50 parts by weight of a nitric acid solution-soluble vinyl polymer stabilizer selected from the group consisting of a copolymer of a vinyl monomer and an $\alpha$-$\beta$ unsaturated acid anhydride, and a copolymer of a vinyl monomer and a half amide-half ammonium salt of an $\alpha$-$\beta$ unsaturated acid;
(e) about 0.1 to about 66 parts by weight of a gelation agent; and
(f) about 6 to about 150 parts by weight of a carbonaceous fuel immiscible with the said nitric acid solution.

21. A cap sensitive blasting composition of claim 20 wherein the vinyl monomer is selected from the group consisting of ethylene, styrene, ethyl vinyl ether, and methyl vinyl ether; and the $\alpha$-$\beta$ unsaturated acid anhydride is selected from the group consisting of maleic anhydride, citraconic anhydride, aconitic anhydride, and itaconic anhydride.

22. A cap sensitive blasting composition of claim 20 wherein the water soluble acrylic polymer is polyacrylic acid.

23. A cap sensitive blasting composition of claim 20 wherein sufficient gas is introduced into the blasting composition to form a gel having a density from about 0.50 gm./cc. to about 1.60 gms./cc. at about 95° F.

24. A cap sensitive blasting composition of claim 20 wherein the gelation agent is one capable of supplying a ferric ion.

25. A process for preparing a cap sensitive blasting composition which comprises, mixing:
(a) An inorganic nitrate selected from the group consisting of ammonium nitrate and alkali metal nitrate;
(b) A mixture of the following materials aged for a period of about 2 to about 48 hours:
  (1) An aqueous nitric acid solution, and
  (2) A member of the group consisting of a copolymer of a vinyl monomer and an $\alpha$-$\beta$ unsaturated acid anhydride, and a water soluble acrylic polymer;
(c) A carbonaceous fuel immiscible with said nitric acid solution;
(d) A nitric acid solution-soluble vinyl polymer stabilizer selected from the group consisting of a copolymer of a vinyl monomer and an $\alpha$-$\beta$ unsaturated acid anhydride, and a copolymer of a vinyl monomer and a half amide-half ammonium salt of an $\alpha$-$\beta$ unsaturated acid; and
(e) A gelation agent.

26. A process for preparing a cap sensitive blasting composition of claim 25 wherein the vinyl monomer is selected from the group consisting of ethylene, styrene, ethyl vinyl ether, and methyl vinyl ether; and the $\alpha$-$\beta$ unsaturated acid anhydride is selected from the group consisting of maleic anhydride, citraconic anhydride, aconitic anhydride, and itaconic anhydride.

27. A process for preparing a cap sensitive blasting composition of claim 25 wherein a water-in-oil type surfactant is included as a component of the mixing step.

28. A process for preparing a cap sensitive blasting composition of claim 25 wherein sufficient gas is introduced into the gelled blasting composition during mixing to form a gel having a density from about 0.50 gm./cc. to about 1.60 gms./cc. at about 95° F.

29. A process of claim 25 wherein the gelation agent is one capable of supplying a ferric ion in the mixing step.

30. A process for preparing a cap sensitive blasting composition which comprises,
(a) Preparing a dry pre-blend of:
  (1) An inorganic nitrate selected from the group consisting of ammonium nitrate and alkali metal nitrate,
  (2) A stabilizer compound selected from the group consisting of a copolymer of a vinyl monomer and an $\alpha$-$\beta$ unsaturated acid anhydride, and a copolymer of a vinyl monomer and a half amide-half ammonium salt of an $\alpha$-$\beta$ unsaturated acid, and
  (3) A gelation agent;
(b) Preparing a fuel pre-blend of:
  (1) A carbonaceous fuel immiscible with aqueous nitric acid solution;
(c) Preparing an acid pre-blend of:
  (1) An inorganic nitrate selected from the group consisting of ammonium nitrate and alkali metal nitrate,
  (2) Aqueous nitric acid solution, and
  (3) A stabilizer compound of a copolymer of a vinyl monomer and an $\alpha$-$\beta$ unsaturated acid anhydride;

(d) Aging pre-blend (c) for a period of from about 2 to about 48 hours to allow the hydrolysate of the copolymer of a vinyl monomer and an $\alpha$-$\beta$ unsaturated acid anhydride to form; and (e) Mixing pre-blends (a), (b), and (c) at a temperature sufficient to form a substantially uniform gelled composition.

31. A process of claim 30 wherein the vinyl monomer in the dry pre-blend and in the acid pre-blend is selected from the group consisting of ethylene, styrene, ethyl vinyl ether and methyl vinyl ether; and the $\alpha$-$\beta$ unsaturated acid anhydride in the dry pre-blend and in the acid pre-blend is selected from the group consisting of maleic anhydride, citraconic anhydride, aconitric anhydride and itaconic anhydride.

32. A process of claim 30 wherein, pre-blend (a) comprises about 10 to about 250 parts by weight of an inorganic nitrate, from about 0.15 part to about 25 parts by weight of the stabilizer of (a) (2) and from about 0.10 part to about 66 parts by weight of a gelation agent; pre-blend (b) comprises about 6 to about 150 parts by weight of carbonaceous fuel; pre-blend (c) comprises about 10 to about 250 parts by weight of an inorganic nitrate, 100 parts by weight of an aqueous solution of nitric acid containing from about 30% to about 80% by weight of nitric acid, and about 0.15 part to about 25 parts by weight of the stabilizer of (c) (3).

33. A process of claim 30 wherein the combined pre-blends (a), (b), and (c) are maintained at a temperature from about 110° F. to about 135° F. during mixing step (e).

34. A process of claim 30 wherein the inorganic nitrate is selected from the group consisting of ammonium nitrate, potassium nitrate, and sodium nitrate.

35. A process of claim 30 wherein a water-in-oil type surfactant is included as a component.

36. A process of claim 30 wherein the gelation agent is one capable of supplying a ferric ion in mixing step (e).

References Cited

UNITED STATES PATENTS

| | | | |
|---|---|---|---|
| 3,164,503 | 1/1965 | Gehrig | 149—74 X |
| 3,242,019 | 3/1966 | Gehrig | 149—74 X |
| 3,296,044 | 1/1967 | Gehrig | 149—74 X |
| 3,336,981 | 8/1967 | Barron et al. | 149—74 X |

LELAND A. SEBASTIAN, *Primary Examiner.*

U.S. Cl. X.R.

149—20, 60, 61, 74